United States Patent
Shechter et al.

(10) Patent No.: US 9,478,820 B2
(45) Date of Patent: Oct. 25, 2016

(54) SPIRALLY WOUND MICROBIAL FUEL CELL

(75) Inventors: Ronen Itzhak Shechter, Kiryat Tivon (IL); Eytan Baruch Levy, Rosh Ha'ain (IL)

(73) Assignee: EMEFCY LIMITED, Kirvat Tivon (IL)

( * ) Notice: Subject to any disclaimer, the term of this patent is extended or adjusted under 35 U.S.C. 154(b) by 657 days.

(21) Appl. No.: 13/989,691

(22) PCT Filed: Dec. 14, 2010

(86) PCT No.: PCT/IL2010/001051
§ 371 (c)(1),
(2), (4) Date: Jun. 24, 2013

(87) PCT Pub. No.: WO2012/081001
PCT Pub. Date: Jun. 21, 2012

(65) Prior Publication Data
US 2013/0266876 A1    Oct. 10, 2013

(51) Int. Cl.
| | |
|---|---|
| *H01M 8/16* | (2006.01) |
| *H01M 8/02* | (2016.01) |
| *H01M 4/86* | (2006.01) |
| *H01M 8/00* | (2016.01) |
| *C02F 3/00* | (2006.01) |
| *H01M 8/24* | (2016.01) |
| *H01M 4/88* | (2006.01) |

(52) U.S. Cl.
CPC .............. *H01M 8/16* (2013.01); *H01M 4/8626* (2013.01); *H01M 8/004* (2013.01); *H01M 8/0206* (2013.01); *H01M 8/0221* (2013.01); *H01M 8/0228* (2013.01); *C02F 3/005* (2013.01); *H01M 4/8803* (2013.01); *H01M 8/2405* (2013.01); *Y02E 60/527* (2013.01)

(58) Field of Classification Search
None
See application file for complete search history.

(56) References Cited

U.S. PATENT DOCUMENTS

| | | | |
|---|---|---|---|
| 4,049,882 A | * | 9/1977 | Beatty ............... H01M 6/10 429/133 |
| 6,645,374 B2 | | 11/2003 | Cote et al. |
| 7,811,689 B2 | | 10/2010 | Heller |
| 2007/0259217 A1 | | 11/2007 | Logan |

(Continued)

FOREIGN PATENT DOCUMENTS

| | | |
|---|---|---|
| JP | 2008221070 A | 9/2008 |
| WO | 2007121246 A2 | 10/2007 |

(Continued)

OTHER PUBLICATIONS

An English translation of Office Action dated Apr. 30, 2014 which issued during the prosecution of Japanese Patent Application No. 542688/2012.

(Continued)

*Primary Examiner* — Ula C Ruddock
*Assistant Examiner* — Tony Chuo
(74) *Attorney, Agent, or Firm* — Sughrue Mion, PLLC

(57) ABSTRACT

A bacterial fuel cell including at least one anode and at least two cathodes in liquid communication with a liquid to be treated, the at least one anode being separated from the at least two cathodes by at least first and second electrically insulating spacers and the at least one anode and the at least two cathodes being electrically connected across an external load and the at least one anode and the at least two cathodes being wound together generally in a spiral configuration together with at least a third electrically insulating spacer.

26 Claims, 5 Drawing Sheets

(56) References Cited

U.S. PATENT DOCUMENTS

| | | |
|---|---|---|
| 2009/0148759 A1 | 6/2009 | Mitsuda et al. |
| 2010/0261065 A1 | 10/2010 | Babinec et al. |
| 2010/0270158 A1 | 10/2010 | Logan |

FOREIGN PATENT DOCUMENTS

| | | |
|---|---|---|
| WO | 2010/049936 A1 | 5/2010 |
| WO | 2012/081001 A1 | 6/2012 |

OTHER PUBLICATIONS

Jiang et al., "A pilot-scale study on utilizing multi-anode/cathode microbial fuel cells (MAC MFCs) to enhance the power production in wastewater treatment", International Journal of Hydrogen Energy, Elsevier Science Publishers B.V., Barking, GB, vol. 36, No. 1, Aug. 18, 2010, pp. 876-884.

Communication dated Nov. 14, 2014, issued by the European Patent Office in counterpart Application No. 10860724.3.

Written Opinion dated Mar. 15, 2011, which issued during the prosecution of Applicant's PCT/IL2010/001051.

An International Preliminary Report on Patentability dated Jun. 18, 2013, which issued during the prosecution of Applicant's PCT/IL2010/001051.

Bruce E. Logan et al., Microbial Fuel Cells: Methodology and Technology Environ. Sci. Technol., vol. 40 (17), 5181-5192, 2006.

Microbial Fuel Cells—Challenges and Applications, Bruce E. Logan & John M. Regan, Environ Sci. Tech., vol. 40, (17), 5172-5180, 2006.

Stefano Freguia et al., Non-catalyzed cathodic oxygen reduction at graphite granules in microbial fuel cells, Electrochimica Acta 53 (2007) 598-603.

Hong Liu et al., Quantification of the internal resistance distribution in microbial fuel cells, Environmental Science and Technology, 2008, 42 (21) 8101-8107.

International Search Report of PCT/IL2010/001051 dated Mar. 15, 2011.

\* cited by examiner

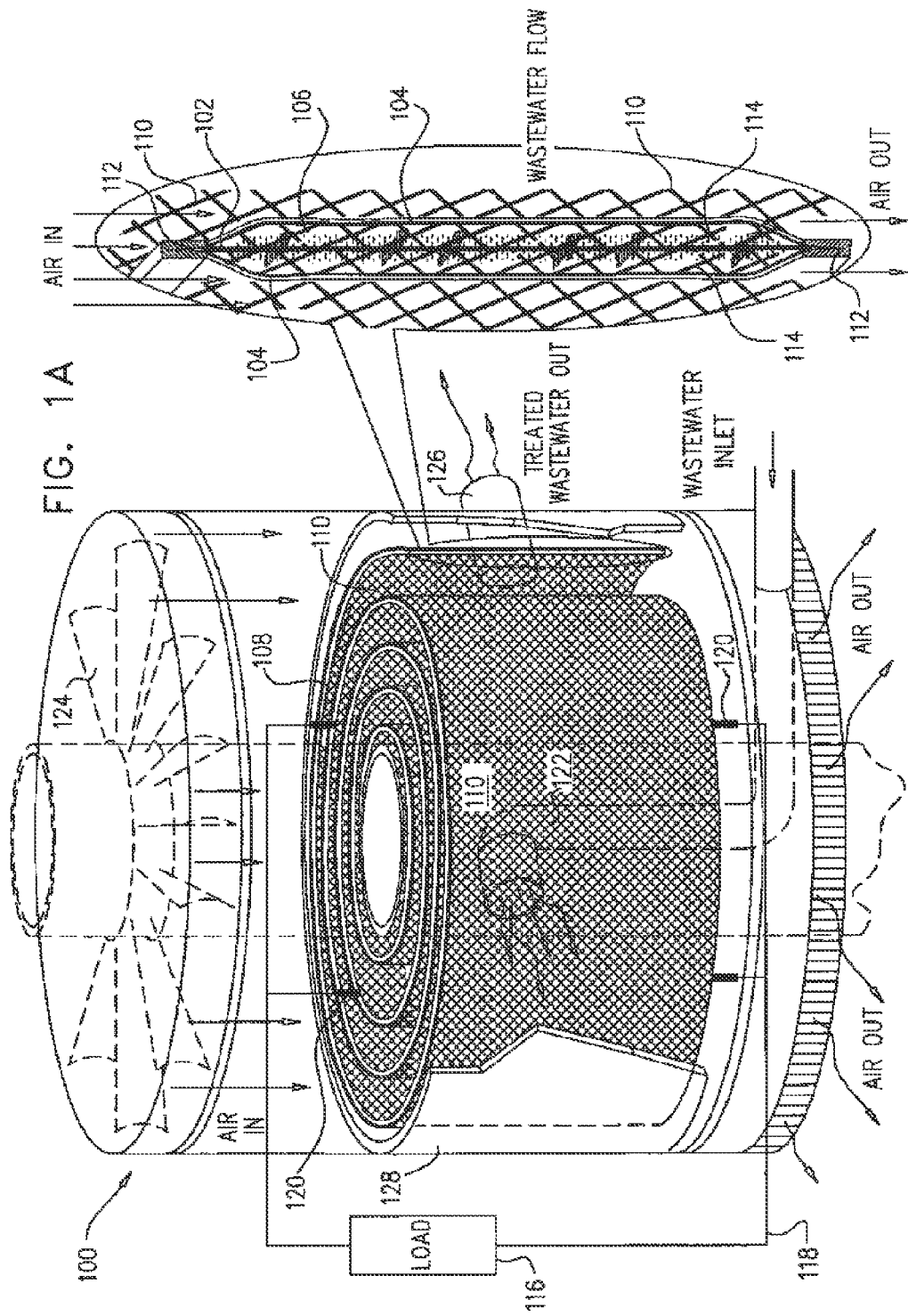

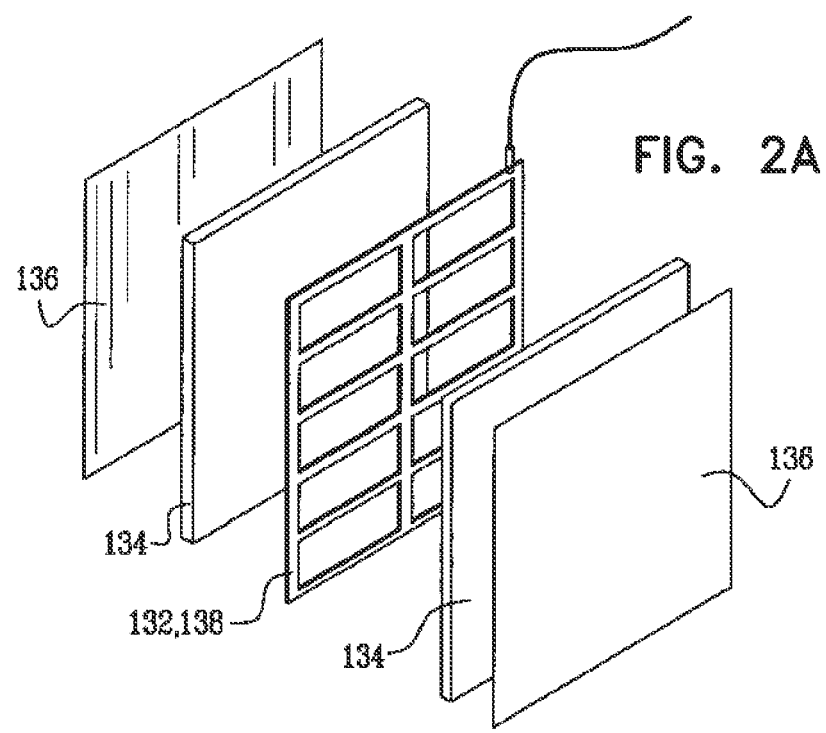
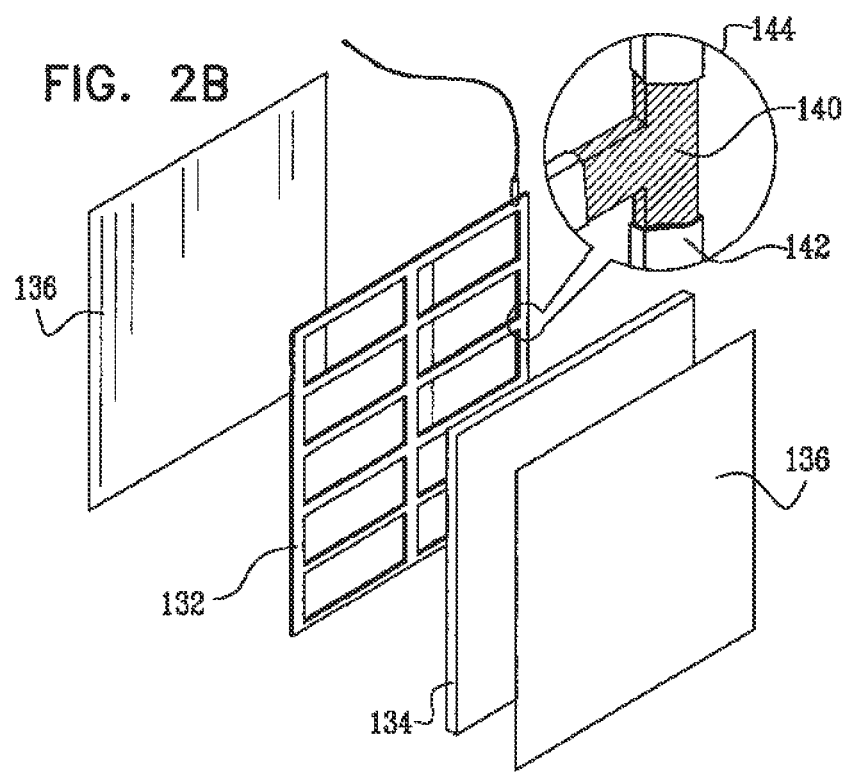

ical devices and more particularly to bacterial fuel
SPIRALLY WOUND MICROBIAL FUEL CELL This application is a National Stage of International Application No. PCT/IL2010/001051, filed on Dec. 14, 2010, the contents of all of which are incorporated herein by reference in their entirety.

REFERENCE TO RELATED APPLICATIONS

Reference is hereby made to PCT Published Patent Application No. WO 2010/049936, entitled ELECTRODES FOR USE IN BACTERIAL FUEL CELLS AND BACTERIAL ELECTROLYSIS CELLS AND BACTERIAL FUEL CELLS AND BACTERIAL ELECTROLYSIS CELLS EMPLOYING SUCH ELECTRODES, filed Nov. 1, 2009, the disclosure of which is hereby incorporated by reference.

FIELD OF THE INVENTION

The present invention relates generally to bioelectric chemical devices and more particularly to bacterial fuel cells.

BACKGROUND OF THE INVENTION

The following publications are believed to represent the current state of the art:
Microbial Fuel Cells: Methodology and Technology, Bruce E. Logan et al, Environ. Sci. Technol., 40 (17), 5181-5192, 2006;
Microbial Fuel Cells—Challenges and Applications, Bruce E. Logan & John M. Regan, Environ. Sci. Tech., 40 (17), 5172-5180, 2006;
Stefano Freguia, Korneel Rabaey, Zhiguo Yuan, Jurg Keller, Non-catalyzed cathodic oxygen reduction at graphite granules in microbial fuel cells, Electrochimica Acta, 53, 598-603, 2007;
Hong Liu et al., Quantification of the internal resistance distribution of microbial fuel cells, Environ. Sci. Technol., 42 (21), 8101-8107, 2008;
US published patent application no. 20070259217; and
PCT published patent application no. WO 2010/049936.

SUMMARY OF THE INVENTION

The present invention seeks to provide an improved bacterial fuel cell for use in wastewater treatment.

There is thus provided in accordance with a preferred embodiment of the present invention a bacterial fuel cell including at least one anode and at least two cathodes in liquid communication with a liquid to be treated, the at least one anode being separated from the at least two cathodes by at least first and second electrically insulating spacers and the at least one anode and the at least two cathodes being electrically connected across an external load and the at least one anode and the at least two cathodes being wound together generally in a spiral configuration together with at least a third electrically insulating spacer.

In accordance with a preferred embodiment of the present invention, the at least one anode and the at least two cathodes are formed of a flexible material.

Preferably, sealing is provided between the at least two cathodes, whereby the at least one anode is enclosed inside an enclosure including the sealing and the at least two cathodes.

Preferably, the electrically insulating spacers include plastic nets.

Preferably, the at least two cathodes are oxygen permeable.

Preferably, a multiplicity of electrical output connections is distributed along a length of the spiral.

In accordance with a further preferred embodiment of the present invention, the at least one anode and the at least two cathodes each include a metal electrical conductor and an electrically conductive coating at least between the metal electrical conductor and the liquid to be treated, the electrically conductive coating being operative to mutually seal the liquid and the electrical conductor from each other.

Preferably, the metal electrical conductor includes a coated metal electrical conductor and the electrically conductive coating includes an electrically conductive coating formed onto the metal electrical conductor.

Preferably, the coated metal electrical conductor of at least one of the at least two cathodes is water permeable.

Preferably, the bacterial fuel cell also includes at least one conductive surface adapted for biofilm growth on a surface thereof, which conductive surface is in liquid communication with the liquid to be treated and is in electrical communication with the metal electrical conductor via the electrically conductive coating.

Preferably, the electrically conductive coating is adapted for biofilm growth on a surface thereof and the at least one conductive surface adapted for biofilm growth is defined by a fabric overlying a surface of the electrically conductive coating.

Additionally or alternatively, the at least one surface adapted for biofilm growth is defined by a conductive fabric, wherein the metal electrical conductor includes a coated metal electrical conductor and the electrically conductive coating includes an electrically conductive coating formed on the metal electrical conductor.

Preferably, the conductive fabric includes carbon.

In accordance with another preferred embodiment of the present invention, the at least two cathodes each also includes an oxygen permeable, liquid-impermeable layer adjacent the electrically conductive coating and the oxygen permeable, liquid-impermeable layer is exposed to an oxygen-containing gas.

Preferably, the oxygen permeable, liquid-impermeable layer includes silicone rubber or includes a micro-perforated film including a poly olefin such as polyethylene or polypropylene.

In accordance with yet another preferred embodiment of the present invention, the metal electrical conductor includes a perforated planar element.

Preferably, at least one of the at least two cathodes includes an attachment layer and the attachment layer preferably includes a plastic fabric.

Preferably, the electrically conductive coating includes a conductive plastic.

Preferably, the metal electrical conductor includes copper or aluminum.

In accordance with a preferred embodiment of the present invention, a wastewater treatment installation includes a plurality of bacterial fuel cells and the plurality bacterial fuel cells is arranged in a stacked configuration.

Preferably, the plurality of bacterial fuel cells is hydraulically connected in series. Additionally or alternatively, the plurality of bacterial fuel cells is hydraulically connected in parallel.

Additionally or alternatively, the plurality of bacterial fuel cells is electrically interconnected.

BRIEF DESCRIPTION OF THE DRAWINGS

The present invention will be understood and appreciated more fully from the following detailed description, taken in conjunction with the drawings in which:

FIGS. 1A and 1B are simplified respective illustrations of a bacterial fuel cell and an enlarged portion thereof, constructed and operative in accordance with a preferred embodiment of the present invention;

FIGS. 2A and 2B are simplified expanded illustrations of two alternative embodiments of an anode useful in a bacterial fuel cell of the type illustrated in FIGS. 1A and 1B, constructed and operative in accordance with a preferred embodiment of the present invention;

DETAILED DESCRIPTION OF PREFERRED EMBODIMENTS

Figure 1B:
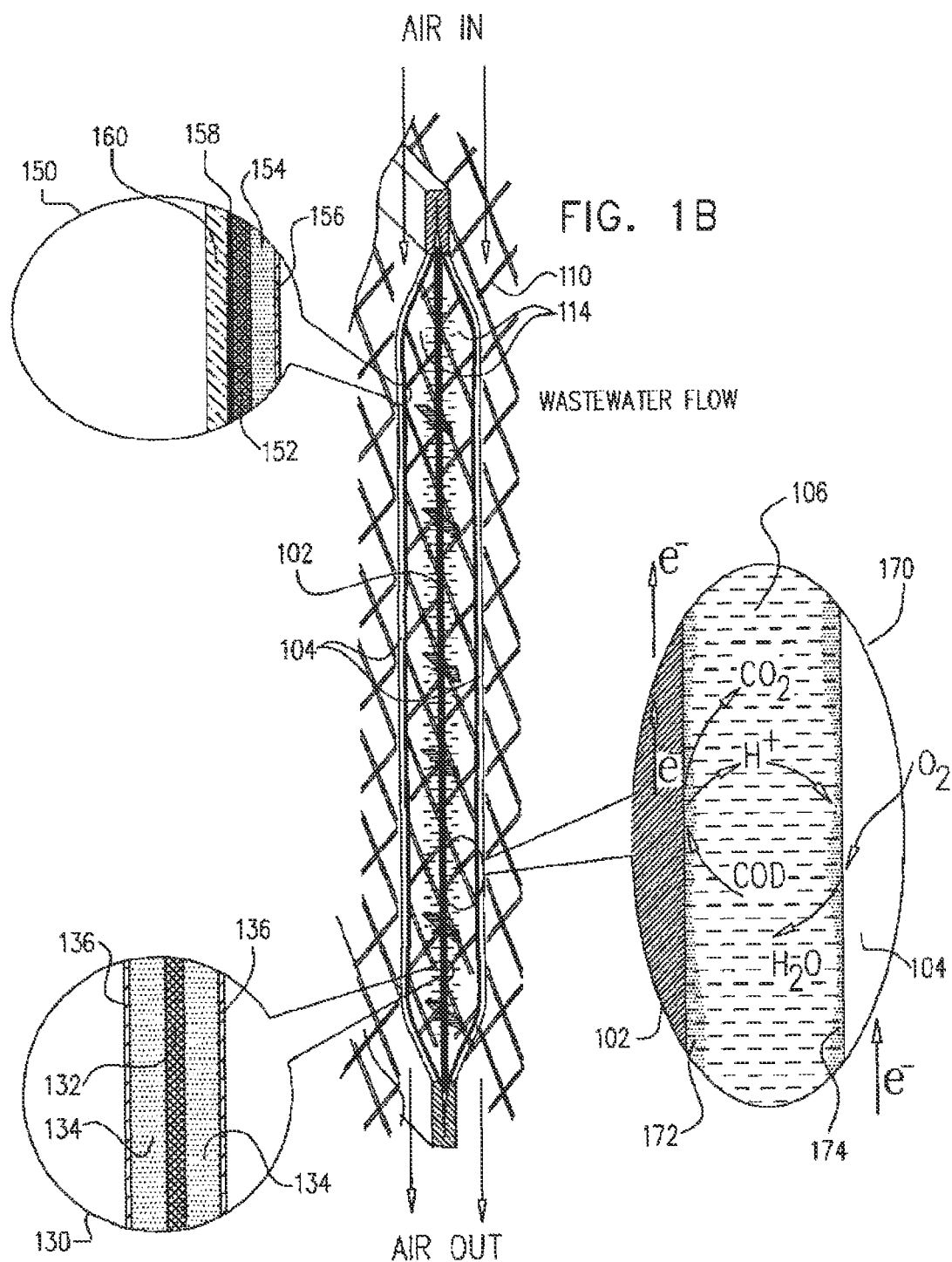

Reference is now made to FIGS. 1A and 1B, which are simplified respective illustrations of a bacterial fuel cell and an enlarged portion thereof, constructed and operative in accordance with a preferred embodiment of the present invention.

As seen in FIGS. 1A and 1B, there is provided a bacterial fuel cell 100 including an anode 102 flanked by first and second cathodes 104, each in liquid communication with a liquid to be treated, such as industrial or municipal wastewater 106. Anode 102 and cathodes 104 are preferably formed of a flexible material and are preferably wound together in a generally spiral configuration 108, together with an electrically insulative spacer 110. The thickness of electrically insulative spacer 110 defines a separation between adjacent layers of the spiral 108 thereby allowing air to flow therebetween and hence electrically insulative spacer 110 may also be termed an air-side spacer 110. It is appreciated that the gap shown in FIG. 1A between air-side spacer 110 and adjacent layers of the spiral 108 is shown for purposes of clarity of presentation only, since in fact air-side spacer 110 preferably constitutes the entire separation between adjacent layers of spiral 108 and no additional spacing is present.

Cathodes 104 preferably enclose anode 102 by means of a plastic welding 112 preferably provided at top and bottom edges of cathodes 104, which plastic welding 112 serves both to seal and to mutually isolate the anode and cathodes 102 and 104. Anode 102 is preferably spaced apart from cathodes 104 by means of at least two electrically insulative spacers 114. Electrically insulative spacers 114 define a separation between the anode 102 and cathodes 104 thereby allow wastewater 106 to flow between the central anode 102 and the cathodes 104 on either side of it. Hence, electrically insulative spacers 114 may also be termed water-side spacers 114.

Air-side spacer 110 and water-side spacers 114 each preferably comprise flexible highly perforated nets, the thicknesses of which are determined according to the system's hydraulic requirements. Specifically, the use of relatively thinner spacers 110 and 114 provides increased active surface area per unit volume, thereby allowing the system to be more compact, whereas the use of relatively thicker water-side spacers 114 leads to reduced clogging along the wastewater flow path. Given these considerations, it is generally preferable to include spacers 110 and 114 having thicknesses in the range of 4-15 mm which provide a sufficiently high surface area and sufficiently low susceptibility to clogging, following conventional pre-treatment screening processes of the wastewater 106.

Anode 102 and cathodes 104 are preferably electrically connected across an external load 116 via an electrical circuit 118. A multiplicity of electrical output connections 120 is preferably distributed along a length of the spiral 108. Electrical output connections 120 preferably provide for current discharge, whereby resistances and hence ohmic losses are minimized.

It is appreciated that although in the embodiment illustrated in FIGS. 1A and 1B only a single anode and two cathodes are shown, the inclusion of more anodes and/or cathodes is also possible. Additional sets of one anode and two cathodes may be included in the embodiment illustrated in FIGS. 1A and 1B by means of connecting multiple ones of spiral 108 in series or in parallel and/or by using a spiral having multiple layers of anodes and cathodes.

Spiral 108, including anode 102, cathodes 104 and intervening water-side spacers 114, may be manufactured by roll-to-roll processing methods, which methods are well known in the art. Following manufacture the spiral 108 may be rolled together with air-side spacer 110, the thickness of which, as described above, defines the separation between adjacent turns of the spiral 108.

The production of anode 102, cathodes 104, air-side spacer 110 and water-side spacers 114 in the form of continuous rolls rather than as pluralities of discrete components significantly reduces production costs and increases production efficiency. Furthermore, maintenance and quality control of the spiral 108 is simplified, since the spiral may simply be unrolled as required in order to correct any deficiencies that may arise during the course of operation.

In operation of bacterial fuel cell 100, wastewater 106 enters the cell at an inner end of the spiral 108 via an inlet port 122 and is preferably evenly distributed by means of a flow distribution element. Water-side spacers 114 serve to maintain an even distribution of wastewater and to sustain sufficient turbulence. Air preferably enters the top of bacterial fuel cell 100 and flows downwards through the cell. Air is preferably evenly distributed across the spiral 108 by means of a fan 124 or similar ventilation apparatus that may be installed in the vicinity of bacterial fuel cell 100 and air-side spacer 110 serves to maintain an even distribution of air and to sustain sufficient turbulence. Wastewater 106 is biologically treated as it flows through bacterial fuel cell 100 so as to decrease its concentration of organic matter, as will be explained in greater detail below. Treated wastewater exits at an outer end of the spiral 108 via an outlet port 126 and outgoing air is preferably freely discharged to the atmosphere. Bacterial fuel cell 100 is preferably enclosed within a cylindrical enclosure 128.

It is appreciated that the direction of wastewater flow described above may also be reversed, with wastewater 106 entering the bacterial fuel cell 100 at an outer end of spiral 108 and treated wastewater exiting at an inner end of spiral 108.

As seen most clearly in FIG. 1B, anode 102 and cathodes 104 each preferably comprises a multilayered structure, including a metal electrical conductor surrounded by an electrically conductive coating. The construction of anode 102 is best understood with reference to enlargement 130 in FIG. 1B. It is seen that a metal conductor 132, preferably formed of copper or aluminum, is surrounded by an electrically conductive coating 134. The electrically conductive coating 134 is preferably formed by laminating a pair of liquid impermeable conductive plastic sheets so as to encase the metal conductor 132 or by co-extruding the metal conductor with a conductive plastic to form a round or flat cable. Preferably, the conductive plastic coating is formed of a plastic such as polyethylene, polypropylene or EVA or a combination thereof, which is compounded with a conductive powder, such as a carbon and/or graphite powder, so as to produce a conductive compound processed to coat the metal.

Biofilm growth is preferably supported on the outer surfaces of electrically conductive coating 134. Optionally a biofilm growth support 136 is provided on at least one outer surface of electrically conductive coating 134. Biofilm growth support 136 is preferably formed of a non-woven plastic or carbon fabric and preferably also functions as an attachment layer.

Typical thicknesses of the various elements of anode 102 are as follows:
Metal conductor 132 20-200 microns;
conductive coating 134 50-400 microns; and
biofilm growth support 136 10-50 microns.

Reference is additionally made to FIGS. 2A and 2B, which illustrate two alternative embodiments of anode 102. In the embodiment of FIG. 2A, the conductor 132 is preferably in the form of a perforated planar element and is designated by an additional reference numeral 138 and the electrically conductive coating 134 is preferably in the form of a sheet or film of conductive plastic. In the embodiment of FIG. 2B, the conductor 132 is preferably in the form of a perforated planar metal element 140, all of whose surfaces are coated by a liquid-impermeable electrically conductive coating 142, as seen at enlargement 144. Carbon-based fabric coating 134 is preferably attached to conductor 132 on either side thereof. Attachment and biofilm growth support layer 136 is preferably made of a non-woven plastic.

The construction of cathodes 104 is best understood with reference to enlargement 150 in FIG. 1B. It is appreciated that although enlargement 150 is shown to emanate from the left hand side cathode 104, the structure shown therein is equally applicable to the right hand side cathode 104. It is seen that a perforated metal conductor 152, preferably formed of copper or aluminum, is surrounded by an electrically conductive coating, which electrically conductive coating is preferably realized by coating the metal conductor 152 with a liquid-impermeable electrically conductive plastic and encasing the coated metal conductor on a liquid facing side thereof with an electrically conductive layer 154. Electrically conductive layer 154 is preferably formed of an electrically conductive perforated plastic, produced by compounding a plastic such as polyethylene, polypropylene or EVA or a combination thereof with a conductive powder, such as a carbon and/or graphite powder. Alternatively, the electrically conductive layer 154 may be formed of a carbon-based fabric.

Biofilm growth is preferably supported on outer surfaces of coated metal conductor 152 and electrically conductive layer 154. Optionally, an attachment layer and biofilm growth support 156 is provided on at least one outer surface of electrically conductive layer 154. Attachment layer and biofilm growth support 156 is preferably formed of a non-woven plastic fabric.

On an opposite, air-facing side of coated metal conductor 152 there is preferably provided a liquid-impermeable, oxygen-permeable layer 158, preferably formed of silicone rubber or a micro-perforated polyolefin, such as polypropylene or polyethylene. Outwardly of liquid-impermeable, oxygen-permeable layer 158 there is optionally provided an attachment layer 160 typically comprising a woven or non-woven plastic fabric, such as a polyester or polypropylene, which attachment layer 160 serves to reinforce the structure of cathodes 104.

Typical thicknesses of the various elements of the cathodes 104 shown in enlargement 150 are as follows:

| | |
|---|---|
| perforated coated conductor 152 | 100-600 microns; |
| conductive layer 154 | 20-250 microns; |
| biofilm growth support 156 | 10-50 microns; |
| oxygen-permeable, liquid impermeable layer 158 | 20-500 microns; and |
| attachment layer 160 | 10-50 microns. |

Figure 3:
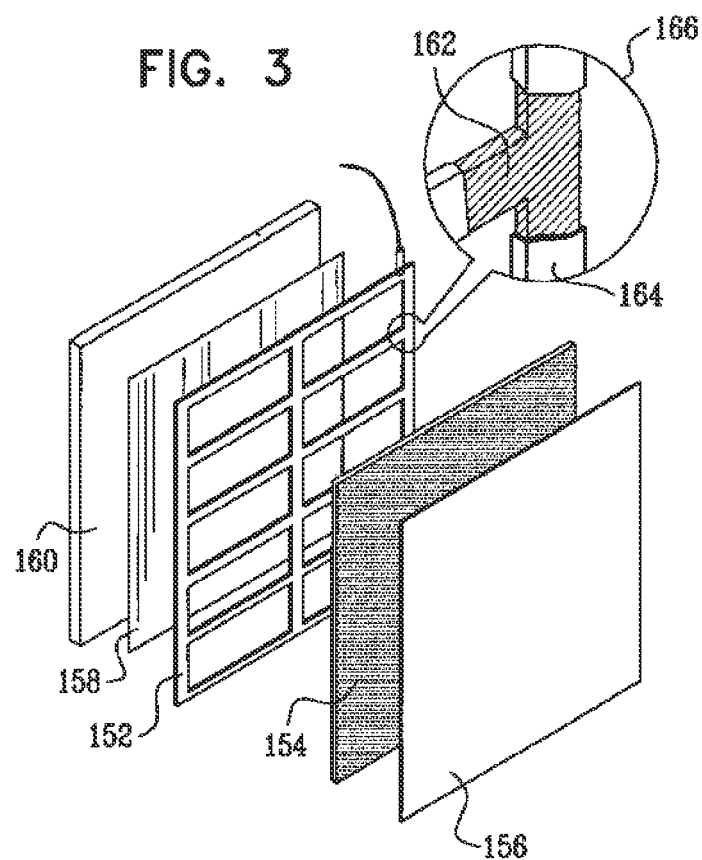
FIG. 3 is a simplified expanded illustration of a cathode useful in a bacterial fuel cell of the type illustrated in FIGS. 1A and 1B, constructed and operative in accordance with a preferred embodiment of the present invention.

Reference is additionally made to FIG. 3, which illustrates an embodiment of cathode 104. As seen in FIG. 3, the perforated conductor 152 includes a perforated planar metal element 162 all of whose surfaces are coated by a liquid impermeable electrically conductive coating 164, as seen at enlargement 166.

The operation of bacterial fuel cell 100 is best understood with reference to enlargement 170 of FIG. 1B. As seen at enlargement 170, organic matter in the wastewater 106, indicated as chemical oxygen demand (COD) is oxidized by electrogenic bacteria, such as Geobacter and Shewanella, which typically reside in a biofilm 172, which biofilm 172 is preferably supported by biofilm growth support 136 (enlargement 130) which is provided on the surface of anode 102.

This oxidation yields carbon dioxide ($CO_2$), protons and electrons. The protons diffuse through the wastewater 106 towards cathodes 104 and the electrons are supplied by the bacteria to the anode 102 and travel from the anode 102 through the electrical circuit 118 to the cathodes 104.

In the cathodes 104, atmospheric oxygen ($O_2$) permeates through the oxygen permeable layers, such as layer 158 shown at enlargement 150. At the wastewater facing side of the conductive plastic layer the $O_2$ reacts with the protons and the electrons to produce water ($H_2O$). This reaction typically requires catalysis that is preferably provided by a biofilm 174, which biofilm 174 is preferably supported by biofilm growth support 156 (enlargement 150), preferably provided on the surfaces of cathodes 104. A material for catalysis or mediation in oxygen reduction may additionally be attached to biofilm support layer 156.

The operation of the bacterial fuel cell of FIGS. 1-3 is thus appreciated to provide both electrical power and treatment of liquids having organic material therein.

Figure 4:
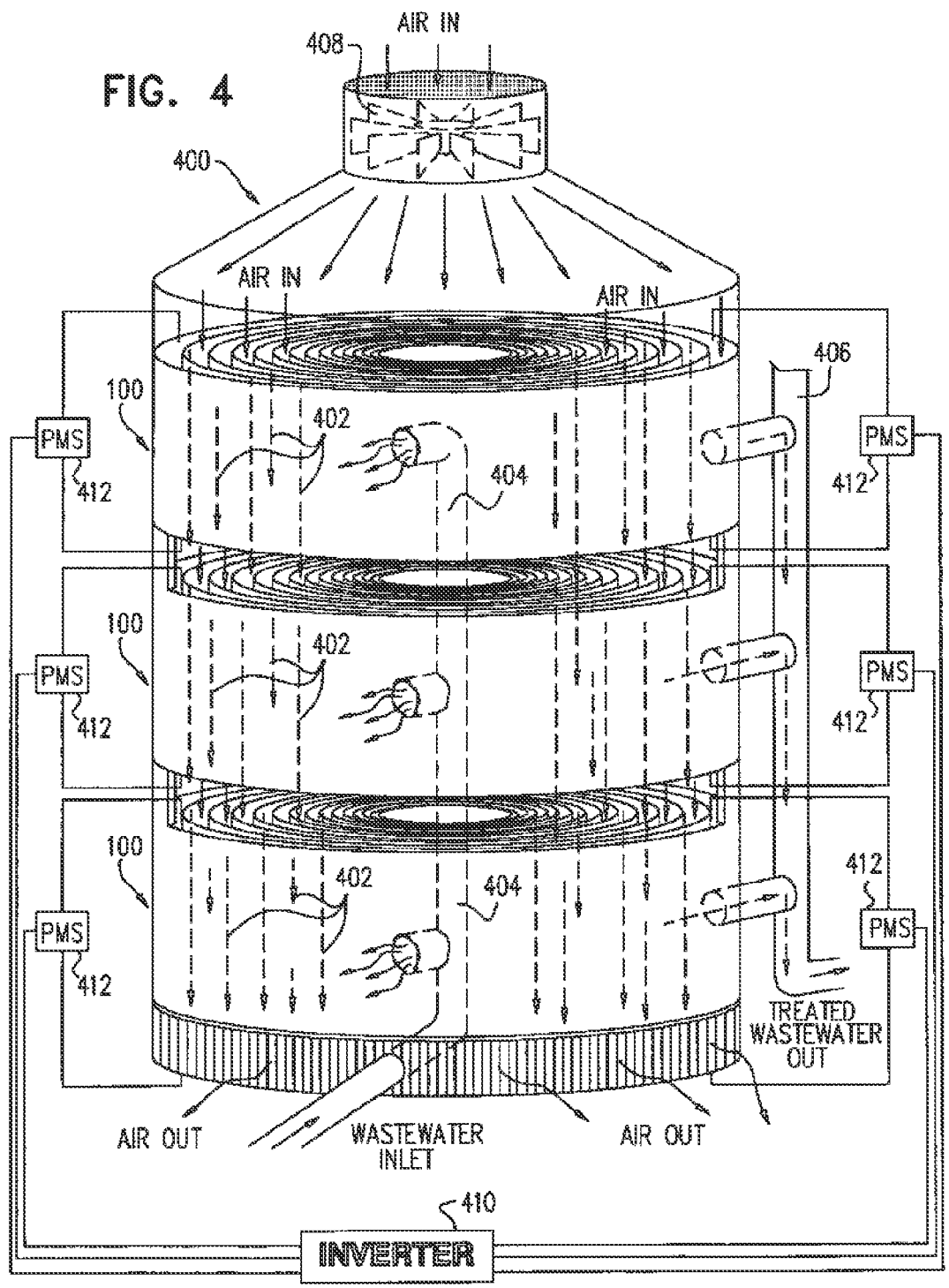
FIG. 4 is a simplified illustration of a wastewater treatment installation employing multiple ones of bacterial fuel cells of the type illustrated in FIGS. 1-3, constructed and operative in accordance with a preferred embodiment of the present invention.

Reference is now made to FIG. 4, which is a simplified illustration of a compact, low energy wastewater treatment installation employing multiple ones of bacterial fuel cells of the type illustrated in FIGS. 1-3, constructed and operative in accordance with a preferred embodiment of the present invention.

As seen in FIG. 4, a compact, low energy wastewater treatment installation 400 includes a plurality of stacked modular bacterial fuel cells 100, which bacterial fuel cells 100 are preferably arranged to define a generally vertical airflow passageway 402 between the windings thereof.

Preferably, the bacterial fuel cells 100 are mutually stacked such that their respective vertical airflow passageways 402 are mutually aligned. Wastewater enters each of the bacterial fuel cells 100 via a wastewater supply manifold 404, which wastewater supply manifold 404 is preferably modular, and treated wastewater exits each of the bacterial fuel cells 100 via a treated wastewater manifold 406, which treated wastewater manifold 406 is also preferably modular.

Preferably, vertical airflow through airflow passageways 402 of multiple stacked bacterial fuel cells 100 is produced by a fan 408, which fan 408 may be powered by electricity produced by the system through connection to an inverter 410 or by any other suitable power source. Alternatively, where sufficient draft may be created by means of heat or wind, the use of fan 408 may be fully or partially obviated. In the illustrated embodiment of FIG. 4, respective stacked bacterial fuel cells 100 are shown connected in parallel. It is appreciated, however, that they may alternatively be connected in series.

Preferably, each of bacterial fuel cells 100 is electrically connected to a power management system (PMS) 412, which PMS 412 is in turn in electrical contact with the inverter 410. At the inverter 410, a number of PMSs 412 may be combined in series or in parallel, depending on the electrical requirements of the system.

It is thus appreciated that multiple ones of bacterial fuel cell 100 may be interconnected both hydraulically and electrically in series and/or in parallel. It is also appreciated that multiple installations 400 may be interconnected in series or in parallel, depending on the nature of the wastewater and the treatment requirements. A parallel hydraulic interconnection increases the volume of wastewater that may be treated, whereas a serial hydraulic interconnection increases the extent of purification as a result of treatment. Similarly, a parallel electrical interconnection provides increased current output whereas a serial electrical interconnection provides increased voltage output. It should be noted that hydraulic interconnection of fuel cells may be implemented irrespective of their electrical connections and vice versa.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. A bacterial fuel cell comprising:
at least one anode and at least two cathodes in liquid communication with a liquid to be treated, said at least one anode being separated from said at least two cathodes by at least first and second electrically insulating, water-side spacers and said at least one anode and said at least two cathodes being electrically connected across an external load; and
said at least one anode and said at least two cathodes being wound together generally in a spiral configuration together with at least a third, air side spacer providing a separation between adjacent layers of the spiral, a layer of the spiral being defined by at least one anode and its flanking cathodes, wherein
the air-side spacer has a thickness to permit airflow passageway between layers of the spiral; and the water-side spacers define a separation between the anode and flanking cathodes through which the liquid to be treated flows; and wherein
sealing is provided between said at least two cathodes, whereby said at least one anode is enclosed inside an enclosure including said sealing and said at least two cathodes.

2. A bacterial fuel cell according to claim 1, wherein said at least one anode and said at least two cathodes are formed of a flexible material.

3. A bacterial fuel cell according to claim 1, wherein said electrically insulating spacers comprise plastic nets.

4. A bacterial fuel cell according to claim 1, wherein said at least two cathodes are oxygen permeable.

5. A bacterial fuel cell according to claim 1, wherein a multiplicity of electrical output connections is distributed along a length of said spiral.

6. A bacterial fuel cell according to claim 1, wherein said at least one anode and said at least two cathodes each comprise:
a metal electrical conductor and
an electrically conductive coating at least between said metal electrical conductor and said liquid to be treated, said electrically conductive coating being operative to mutually seal said liquid and said electrical conductor from each other.

7. A bacterial fuel cell according to claim 6, wherein said metal electrical conductor is coated with an electrically conductive coating.

8. A bacterial fuel cell according to claim 7, wherein said coated metal electrical conductor of at least one of said at least two cathodes is water permeable.

9. A bacterial fuel cell according to claim 6, comprising at least one conductive surface adapted for biofilm growth thereon, which conductive surface is in liquid communication with said liquid to be treated and is in electrical communication with said metal electrical conductor via said electrically conductive coating.

10. A bacterial fuel cell according to claim 6, wherein said electrically conductive coating is adapted for biofilm growth on a surface thereof.

11. A bacterial fuel cell according to claim 9, wherein said at least one conductive surface adapted for biofilm growth is defined by a fabric overlying a surface of said electrically conductive coating.

12. A bacterial fuel cell according to claim 9, wherein said at least one conductive surface adapted for biofilm growth is defined by a conductive fabric, wherein said metal electrical conductor comprises a coated metal electrical conductor and said electrically conductive coating comprises an electrically conductive coating formed on said metal electrical conductor.

13. A bacterial fuel cell according to claim 12, wherein said conductive fabric comprises carbon.

14. A bacterial fuel cell according to claim 6, wherein said at least two cathodes each also comprises an oxygen permeable, liquid-impermeable layer adjacent said electrically conductive coating and wherein said oxygen permeable, liquid-impermeable layer is exposed to an oxygen-containing gas.

15. A bacterial fuel cell according to claim 14, wherein said oxygen permeable, liquid-impermeable layer comprises silicone rubber.

16. A bacterial fuel cell according to claim 14, wherein said oxygen permeable, liquid-impermeable layer comprises a micro-perforated film comprising a poly olefin such as polyethylene or polypropylene.

17. A bacterial fuel cell according to claim 6, wherein said metal electrical conductor comprises a perforated planar element.

18. A bacterial fuel cell according to claim 1, wherein at least one of said at least two cathodes includes an attachment layer.

19. A bacterial fuel cell according to claim 18, wherein said attachment layer comprises a plastic fabric.

20. A bacterial fuel cell according to claim 6, wherein said electrically conductive coating comprises a conductive plastic.

21. A bacterial fuel cell according to claim 6, wherein said metal electrical conductor comprises copper.

22. A bacterial fuel cell according to claim 6, wherein said metal electrical conductor comprises aluminum.

23. A wastewater treatment installation comprising a plurality of bacterial fuel cells according to claim 1, wherein said plurality of bacterial fuel cells is arranged in a stacked configuration.

24. A wastewater treatment installation according to claim 23, wherein said plurality of bacterial fuel cells is hydraulically connected in series.

25. A wastewater treatment installation according to claim 23, wherein said plurality of bacterial fuel cells is hydraulically connected in parallel.

26. A wastewater treatment installation according to claim 23, wherein said plurality of bacterial fuel cells is electrically interconnected.

* * * * *